United States Patent
Li et al.

(10) Patent No.: US 10,243,662 B2
(45) Date of Patent: Mar. 26, 2019

(54) BIAS-BASED MACH-ZEHNDER MODULATION (MZM) SYSTEMS

(71) Applicant: HEWLETT PACKARD ENTERPRISE DEVELOPMEN LP, Houston, TX (US)

(72) Inventors: Cheng Li, Palo Alto, CA (US); Jim Huang, Palo Alto, CA (US); Ashkan Seyedi, Palo Alto, CA (US); Marco Fiorentino, Palo Alto, CA (US); Raymond G Beausoleil, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/566,929

(22) PCT Filed: May 27, 2015

(86) PCT No.: PCT/US2015/032680
§ 371 (c)(1),
(2) Date: Oct. 16, 2017

(87) PCT Pub. No.: WO2016/190866
PCT Pub. Date: Dec. 1, 2016

(65) Prior Publication Data
US 2018/0109322 A1    Apr. 19, 2018

(51) Int. Cl.
*H04B 10/00*    (2013.01)
*H04B 10/50*    (2013.01)
(Continued)

(52) U.S. Cl.
CPC ........ *H04B 10/503* (2013.01); *G02F 1/0102* (2013.01); *G02F 1/0123* (2013.01); *G02F 1/225* (2013.01); *G02F 2001/212* (2013.01)

(58) Field of Classification Search
USPC .......................................... 398/198
See application file for complete search history.

(56) References Cited

U.S. PATENT DOCUMENTS

| 5,453,608 A * | 9/1995 | Conder | G02F 1/0123 |
| | | | 250/205 |
| RE36,088 E * | 2/1999 | Kuwata | G02F 1/0123 |
| | | | 372/28 |

(Continued)

OTHER PUBLICATIONS

International Search Report & Written Opinion received in PCT Application No. PCT/US2015/032680, dated Mar. 31, 2016, 13 pages.

(Continued)

*Primary Examiner* — Agustin Bello
(74) *Attorney, Agent, or Firm* — Nolte Intellectual Property Law Group

(57) ABSTRACT

One example includes a bias-based Mach-Zehnder modulation (MZM) system. The system includes a Mach-Zehnder modulator to receive and split an optical input signal and to provide an intensity-modulated optical output signal based on a high-frequency data signal to modulate a relative phase of the split optical input signal to transmit data and based on a bias voltage to modulate the relative phase of the split optical input signal to tune the Mach-Zehnder modulator. The system also includes a bias feedback controller to compare a detection voltage associated with the intensity-modulated output signal with a reference voltage to measure an extinction ratio associated with an optical power of the intensity-modulated optical output signal and to adjust the bias voltage based on the comparison to substantially maximize the extinction ratio.

18 Claims, 4 Drawing Sheets

(51) Int. Cl.
  *G02F 1/225* (2006.01)
  *G02F 1/01* (2006.01)
  *G02F 1/21* (2006.01)

(56) References Cited

U.S. PATENT DOCUMENTS

| | | | |
|---|---|---|---|
| 6,014,392 A | 1/2000 | Imai et al. | |
| 6,304,690 B1* | 10/2001 | Day | G02B 6/29355 385/134 |
| 6,539,038 B1 | 3/2003 | Wilkerson, Jr. et al. | |
| 7,251,403 B1* | 7/2007 | Gunn, III | G02B 6/12004 385/129 |
| 7,555,216 B2* | 6/2009 | Yoshino | H04B 10/548 398/193 |
| 7,936,996 B2 | 5/2011 | Kawanishi et al. | |
| 8,145,069 B2* | 3/2012 | Tanaka | H04B 10/505 398/182 |
| 8,160,456 B2* | 4/2012 | Smith | G02F 1/0123 398/195 |
| 8,600,199 B2* | 12/2013 | Morishita | G02F 1/0121 385/2 |
| 8,761,548 B2 | 6/2014 | Kuwahara | |
| 8,867,927 B2 | 10/2014 | Akiyama et al. | |
| 9,291,835 B2* | 3/2016 | Smith | G02F 1/0123 |
| 9,445,165 B2* | 9/2016 | Dorin | H04Q 11/0005 |
| 9,658,476 B2* | 5/2017 | Smith | G02F 1/0123 |
| 9,846,318 B2* | 12/2017 | Smith | G02F 1/0123 |
| 2002/0061034 A1* | 5/2002 | Schneider | G02F 1/0123 372/26 |
| 2003/0107791 A1* | 6/2003 | Seung Il | G02F 1/0123 359/245 |
| 2004/0033082 A1* | 2/2004 | Sakamoto | H04B 10/25137 398/198 |
| 2006/0083144 A1* | 4/2006 | Piede | G02F 1/025 369/100 |
| 2006/0147219 A1* | 7/2006 | Yoshino | H04B 10/548 398/183 |
| 2006/0210210 A1* | 9/2006 | Webb | G02F 1/0123 385/1 |
| 2008/0080872 A1* | 4/2008 | Tanaka | H04B 10/505 398/186 |
| 2008/0199182 A1* | 8/2008 | Ooi | H04B 10/2513 398/81 |
| 2009/0074419 A1* | 3/2009 | Pappert | H04B 10/25137 398/91 |
| 2012/0033964 A1* | 2/2012 | Mamyshev | G02F 1/0123 398/25 |
| 2012/0087617 A1* | 4/2012 | Morishita | G02F 1/0121 385/3 |
| 2014/0010530 A1 | 1/2014 | Goebuchi | |
| 2014/0355979 A1* | 12/2014 | Dorin | H04Q 11/0005 398/27 |
| 2014/0363175 A1* | 12/2014 | Yamanaka | H04B 10/5053 398/183 |
| 2015/0071583 A1 | 3/2015 | Nishimoto et al. | |
| 2015/0110436 A1* | 4/2015 | Smith | G02F 1/0123 385/2 |
| 2015/0110437 A1* | 4/2015 | Smith | H04B 10/50595 385/2 |
| 2015/0124309 A1* | 5/2015 | Smith | G02F 1/0123 359/276 |
| 2018/0109322 A1* | 4/2018 | Li | H04B 10/503 |

OTHER PUBLICATIONS

Mackay, A.W., "Complex Phase Biasing of Silicon Mach-Zehnder Interferometer Modulators," (Research Paper), University of Toronto, 2014, 85 pages, https://tspace.library.utoronto.ca/bitstream/1807/44043/1/MacKay_Alex_W_201403_MASc_thesis.pdf.

EPO; "Supplementary European Search Report" cited in Appl. No. 15893505.6; dated Oct. 1, 2018; 9 pages.

\* cited by examiner

BIAS-BASED MACH-ZEHNDER MODULATION (MZM) SYSTEMS

STATEMENT OF GOVERNMENT INTEREST

This invention was made with government support under Contract No. H98230-14-3-0011, awarded by the Maryland Procurement Office. The government has certain rights in the invention.

BACKGROUND

Optical communication is becoming a much more prevalent way of transmitting data in computer and communications systems. One example of a system of modulating data for optical communication is a Mach-Zehnder modulation (MZM) system. A MZM system can implement a Mach-Zehnder interferometer to provide amplitude modulation of an optical signal based on a beam splitter that divides laser light into a plurality of paths to provide a relative phase modulation, such that changing the relative phase can determine whether the beams interfere constructively or destructively at a respective output to control an intensity of the optical output signal. The performance of an MZM system can be affected by a variety of factors, such as the environmental temperature change and arm length mismatch due to the fabrication variability. One such solution for tuning an MZM system is to adjust a temperature of the MZM system via a resistor implanted close to the photonic device to heat the waveguide of the interferometer, thus changing an associated refractive index. However, such a solution can result in a slower tuning speed based on a device thermal time constant that is limited, and thus necessitating longer calibration times, as well as degrading overall link power efficiency based on an increase in tuning power overhead.

DETAILED DESCRIPTION

Figure 1:
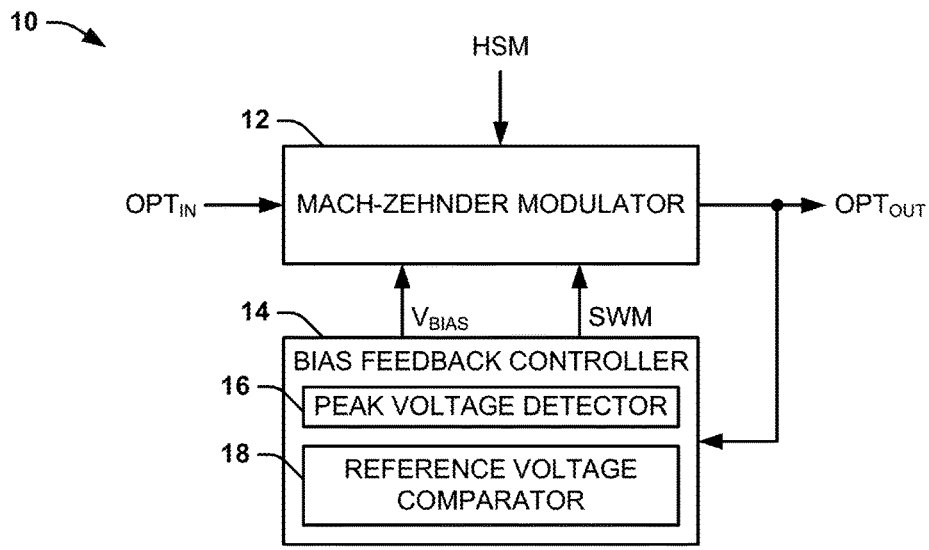
FIG. 1 illustrates an example of a Mach-Zehnder modulation system.

FIG. 1 illustrates an example of a Mach-Zehnder modulation (MZM) system 10. The MZM system 10 can be implemented in any of a variety of optical data communication applications to modulate data into an optical input signal $OPT_{IN}$ to generate an optical output signal $OPT_{OUT}$. The MZM system 10 includes a Mach-Zehnder modulator 12 that is configured to receive the optical input signal $OPT_{IN}$ and to provide the optical output signal $OPT_{OUT}$ as a data-modulated signal. For example, the Mach-Zehnder modulator 12 can be configured to split the optical input signal $OPT_{IN}$ into approximately equal component portions (e.g., two approximately equal portions), to modulate a relative phase of the component portions of the optical input signal $OPT_{IN}$ based on a modulation signal HSM, to recombine the modulated component portions, and to provide the recombined portions as the optical output signal $OPT_{OUT}$. The modulation of the optical output signal $OPT_{OUT}$ via the modulation signal HSM can be based on a substantially high modulation data rate of the modulation signal HSM to provide a relative phase-change between the component portions of the optical input signal $OPT_{IN}$, such that the relative phase changes can provide an additive or subtractive effect of the amplitude of the optical output signal $OPT_{OUT}$ after recombination of the component portions of the optical input signal $OPT_{IN}$. Therefore, the optical output signal $OPT_{OUT}$ can be modulated to carry a data signal defined by the modulation signal HSM based on a respective modulated amplitude of the optical output signal $OPT_{OUT}$.

The MZM system 10 also includes a bias feedback controller 14 configured to provide a bias voltage $V_{BIAS}$ to set a bias amplitude of the Mach-Zehnder modulator 12 for the modulation of the optical input signal $OPT_{IN}$ via the modulation signal HSM. The bias feedback controller 14 can also be configured to substantially stabilize the bias voltage $V_{BIAS}$ in a feedback manner to tune the MZM system 10. In the example of FIG. 1, the bias feedback controller 14 provides a switching signal SWM to the Mach-Zehnder modulator 12 to modulate the phase of the optical input signal $OPT_{IN}$ to tune the Mach-Zehnder modulator 12 based on the bias voltage $V_{BIAS}$ (e.g., to provide alternate control of a set of switches to apply the bias voltage $V_{BIAS}$ via a respective set of PIN diodes associated with the Mach-Zehnder modulator 12). The bias feedback controller 14 can thus stabilize the amplitude of the bias voltage $V_{BIAS}$ to maintain a sufficient bias for the data modulation of the optical input signal $OPT_{IN}$ via the modulation signal HSM to provide the optical output voltage $OPT_{OUT}$.

In the example of FIG. 1, the bias feedback controller 14 includes a peak voltage detector 16 and a reference voltage comparator 18. The peak voltage detector 16 is configured to monitor a peak intensity of the optical output signal $OPT_{OUT}$ based on modulating a relative phase of the component portions of the optical input signal $OPT_{IN}$. As an example, the optical intensity of the modulated optical output signal $OPT_{OUT}$ can be monitored by the bias feedback controller 14 via a photodetector (e.g., photodiode) to provide a detection voltage. Thus, the peak voltage detector 16 can be configured to monitor a peak voltage associated with a peak amplitude of the detection voltage. The reference voltage comparator 18 can thus compare the peak voltage with a predetermined reference voltage and can adjust the amplitude of the bias voltage $V_{BIAS}$ based on the comparison. For example, the bias feedback controller 14 can be configured to monitor an extinction ratio associated with the phase-shift about a bias point associated with the bias voltage $V_{BIAS}$. As described in greater detail herein, the bias feedback controller 14 can substantially continuously adjust the bias voltage $V_{BIAS}$ in a feedback manner to substantially maximize the extinction ratio.

For example, the bias feedback controller 14 can set an initial predetermined low amplitude of the bias voltage $V_{BIAS}$ and a corresponding predetermined amplitude of the reference voltage. The bias feedback controller 14 can thus iteratively increase the amplitude of the bias voltage $V_{BIAS}$ until the peak amplitude associated with the phase changes of the component portions, and thus the amplitude of the peak voltage, are approximately equal to the reference voltage. Additionally, as described in greater detail herein, the reference voltage can be iteratively increased, such that the bias voltage $V_{BIAS}$ can be iteratively increased during each iteration of the reference voltage, until the bias feedback controller 14 detects an approximate maximum associated with the extinction ratio, such that the bias voltage $V_{BIAS}$ is set to an amplitude corresponding to a quadrature point at an approximate π/2 phase to achieve approximately symmetric modulation, such that corresponding positive and negative 90° relative phase-shifts of the component portions of the optical input signal $OPT_{IN}$ via the switching signal SWM result in respective peak and zero amplitudes of the optical output signal $OPT_{OUT}$, and thus a maximum extinction ratio.

Figure 2:
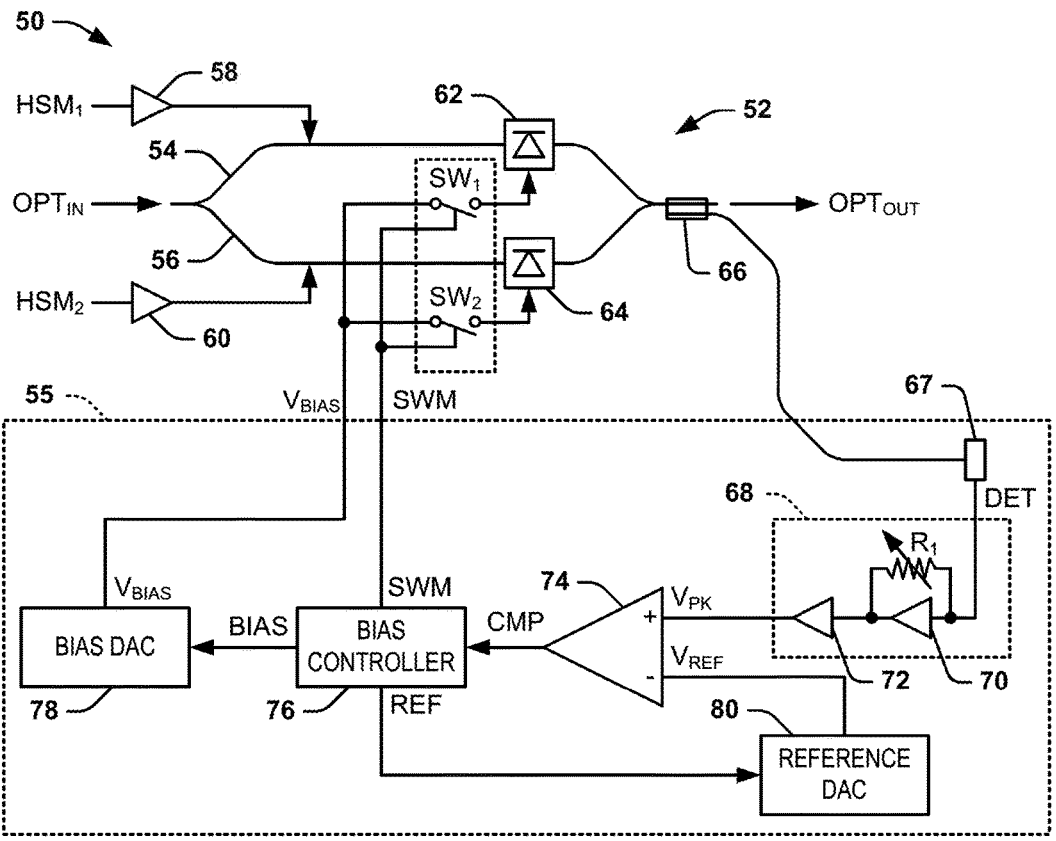
FIG. 2 illustrates another example of a Mach-Zehnder modulation system.

FIG. 2 illustrates another example of an MZM system 50. The MZM system 50 can be implemented in any of a variety of optical data communication applications to modulate data into an optical input signal $OPT_{IN}$ to generate an optical output signal $OPT_{OUT}$. As an example, the MZM system 50 can correspond to the MZM system 10 in the example of FIG. 1.

The MZM system 50 includes a Mach-Zehnder modulator 52 that is configured to receive the optical input signal $OPT_{IN}$ and to provide the optical output signal $OPT_{OUT}$ as a data-modulated signal. In the example of FIG. 2, the Mach-Zehnder modulator 52 splits the optical input signal $OPT_{IN}$ into a pair of approximately equal component portions in a first leg 54 of the Mach-Zehnder modulator 52 and a second leg 56 of the Mach-Zehnder modulator 52, respectively, to modulate a relative phase of the component portions of the optical input signal $OPT_{IN}$ based on a respective pair of high-speed differential modulation signals $HSM_1$ and $HSM_2$. In the example of FIG. 2, the first modulation signal $HSM_1$ is provided to the first leg 54 of the Mach-Zehnder modulator 52 via an amplifier 58 and the second modulation signal $HSM_2$ is provided to the second leg 56 of the Mach-Zehnder modulator 52 via an amplifier 60. The pair of differential modulation signals $HSM_1$ and $HSM_2$ can thus modulate a relative phase of the component portions of the optical input signal $OPT_{IN}$ Mach-Zehnder modulator 52 based on data associated with the pair of differential modulation signals HSM, and $HSM_2$. The Mach-Zehnder modulator 52 can thus recombine the modulated component portions and provide the recombined portions as the optical output signal $OPT_{OUT}$. The modulation of the optical output signal $OPT_{OUT}$ via the differential modulation signals $HSM_1$ and $HSM_2$ can provide a relative phase-change between the component portions of the optical input signal $OPT_{IN}$, such that the relative phase changes can provide an additive or subtractive effect of the amplitude of the optical output signal $OPT_{OUT}$ after recombination of the component portions of the optical input signal $OPT_{IN}$ to modulate the data therein.

The MZM system 50 also includes a bias feedback controller 55. The bias feedback controller 55 is configured to provide a bias voltage $V_{BIAS}$ to set a bias amplitude of the Mach-Zehnder modulator 52 for the modulation of the optical input signal $OPT_{IN}$. The bias feedback controller 55 is also configured to substantially stabilize the bias voltage $V_{BIAS}$ in a feedback manner to tune the MZM system 50. In the example of FIG. 2, the bias feedback controller 55 provides a switching signal SWM to the Mach-Zehnder modulator 52 to modulate the relative phase of the component portions of the optical input signal $OPT_{IN}$ in each of the legs 54 and 56 to tune the Mach-Zehnder modulator 52. The switching signal SWM is provided to a pair of switches $SW_1$ and $SW_2$ that are associated with the respective legs 54 and 56 of the Mach-Zehnder modulator 52, such that a bias voltage $V_{BIAS}$ is provided from the bias feedback controller 55 to each of the legs 54 and 56 via respective PIN diodes 62 and 64. For example, the switching signal SWM can alternately activate the switches $SW_1$ and $SW_2$ (e.g., equally and oppositely) to apply the bias voltage $V_{BIAS}$ to the legs 54 and 56 via the PIN diodes 62 and 64 to provide a relative phase-shift of the component portions of the optical input signal $OPT_{IN}$ separately and independently from the relative phase-shift of the component portions of the optical input signal $OPT_{IN}$ via the differential modulation signals $HSM_1$ and $HSM_2$. As an example, the alternate activation of the switches $SW_1$ and $SW_2$ can be at a frequency that is significantly less than the frequency of the differential modulation signals $HSM_1$ and $HSM_2$ (e.g., by at least one order of magnitude).

The Mach-Zehnder modulator 52 includes an optical power tap 66 that is configured to provide a portion of the optical output signal $OPT_{OUT}$ to the bias feedback controller 55. As an example, the portion of the optical output signal $OPT_{OUT}$ provided via the optical power tap 66 can be approximately 10% of the total optical power of the optical output signal $OPT_{OUT}$. The bias feedback controller 55 includes a photodetector 67 (e.g., a photodiode) that is configured to convert the portion of the optical output signal $OPT_{OUT}$ to an electrical signal, demonstrated in the example of FIG. 2 as a detection signal DET. As an example, the detection signal DET can be provided as a current signal having an amplitude that corresponds to an optical power of the optical output signal $OPT_{OUT}$.

The bias feedback controller 55 also includes a peak voltage detector system 68 that is configured to monitor a peak intensity of the optical output signal $OPT_{OUT}$ based on modulating a relative phase of the component portions of the optical input signal $OPT_{IN}$ based on the detection signal DET. The peak voltage detector system 68 includes a transimpedance amplifier 70 that receives the detection signal DET at an input and is arranged in parallel with a variable resistor $R_1$. The variable resistor $R_1$ can be adjustable, for example, to adjust a gain associated with the transimpedance amplifier 70. The peak voltage detector system 68 also includes a peak sensor 72 arranged in series with the transimpedance amplifier 70 and variable resistor $R_1$, and is configured to generate a peak voltage $V_{PK}$ that is associated with a peak amplitude of the detection signal DET, and thus a peak intensity of the optical output signal $OPT_{OUT}$. As an example, the peak sensor 72 can be configured as a capacitor-based peak sensor that includes reset control. Therefore, the peak voltage detector system 68 can be configured as a filter to generate the peak voltage $V_{PK}$ as a DC voltage corresponding to a peak amplitude of the optical output signal $OPT_{OUT}$ based on the changes to the intensity of the optical output signal $OPT_{OUT}$ resulting from the relative phase modulation based on the switching signal SWM.

The bias feedback controller 55 also includes a reference voltage comparator 74 that is configured to compare the peak voltage $V_{PK}$ with a predetermined reference voltage $V_{REF}$. The reference voltage comparator 74 generates a signal CMP that is indicative of the comparison. In the example of FIG. 2, the reference voltage comparator 74 receives the peak voltage $V_{PK}$ at a non-inverting input and the reference voltage $V_{REF}$ at an inverting input. Thus, the signal CMP is logic-high in response to the peak voltage $V_{PK}$ being approximately equal to or greater than the reference voltage $V_{REF}$. The signal CMP is provided to a bias controller 76 that is configured to control the bias voltage $V_{BIAS}$ and the reference voltage $V_{REF}$ in response to the signal CMP, and thus the comparison of the peak voltage $V_{PK}$ and the reference voltage $V_{REF}$. As an example, the bias controller 76 can be configured to monitor a sequence of 0s and 1s associated with the signal CMP to determine the relative amplitude of the bias voltage $V_{BIAS}$ and the reference voltage $V_{REF}$, such as based to compensate for noise that may affect the MZM system 50. Additionally or alternatively, the reference comparator 74 can include a voltage offset and/or filter(s) to compensate for noise associated with the reference comparator 74.

The bias controller 76 is configured to generate the switching signal SWM, a digital signal BIAS that is indicative of an amplitude of the bias voltage $V_{BIAS}$, and a digital signal REF that is indicative of an amplitude of the reference voltage $V_{REF}$. The digital signal BIAS is provided to a bias digital-to-analog converter (DAC) 78 configured to generate the bias voltage $V_{BIAS}$ based on the digital signal BIAS, and the digital signal REF is provided to a reference DAC 80 configured to generate the reference voltage $V_{REF}$ based on the digital signal REF. As an example, the bias controller 76 can be configured as a state machine that is configured to iteratively adjust the bias voltage $V_{BIAS}$ and the reference voltage $V_{REF}$ in response to the signal CMP to substantially maximize an extinction ratio associated with the optical output signal $OPT_{OUT}$ based on a phase-shift about a bias point associated with the bias voltage $V_{BIAS}$ to tune the MZM system 50.

For example, during initial operation of the MZM system 50, the bias controller 76 can set an initial predetermined low amplitude of the bias voltage $V_{BIAS}$ via the digital signal BIAS and a corresponding predetermined amplitude of the reference voltage $V_{REF}$ via the digital signal REF. The bias controller 76 can monitor the extinction ratio of the optical output signal $OPT_{OUT}$ based on the signal CMP corresponding to the comparison of the peak voltage $V_{PK}$, as defined by the bias voltage $V_{BIAS}$, and the reference voltage $V_{REF}$. The bias controller 76 can thus iteratively increase the amplitude of the bias voltage $V_{BIAS}$ via the digital signal BIAS for a given amplitude of the reference voltage $V_{REF}$ until the peak voltage $V_{PK}$ is approximately equal to the reference voltage $V_{REF}$, and thus the peak amplitude associated with the phase changes of the component portions is approximately equal to an intensity defined by the reference voltage $V_{REF}$.

Upon the peak voltage $V_{PK}$ being approximately equal to the reference voltage $V_{REF}$, the bias controller 76 can increase the amplitude of the reference voltage $V_{REF}$ via the digital signal REF, and can again iteratively increase the bias voltage $V_{BIAS}$ via the digital signal BIAS until the peak voltage $V_{PK}$ is again approximately equal to the reference voltage $V_{REF}$, as indicated by the signal CMP. Therefore, the bias controller 76 can iteratively increase the reference voltage $V_{REF}$ until the bias controller 76 detects an approximate maximum associated with the extinction ratio associated with the optical output signal $OPT_{OUT}$ based on a phase-shift about a bias point associated with the bias voltage $V_{BIAS}$ to tune the MZM system 50. Accordingly, the bias voltage $V_{BIAS}$ is then set to an amplitude corresponding to a quadrature point at an approximate $\pi/2$ phase to achieve approximately symmetric modulation, such that corresponding positive and negative 90° relative phase-shifts of the component portions of the optical input signal $OPT_{IN}$ via the switching signal SWM result in respective peak and zero amplitudes of the optical output signal $OPT_{OUT}$, and thus an approximate maximum extinction ratio.

FIGS. 3-6 illustrate examples of graphs of optical power. Particularly, FIG. 3 demonstrates a graph 100, FIG. 4 demonstrates a graph 150, FIG. 5 demonstrates a graph 200, and FIG. 6 demonstrates a graph 250. The graphs 100, 150, 200, and 250 can correspond to an optical power of the output optical signal $OPT_{OUT}$ as a function of a relative phase of the component portions of the optical input signal $OPT_{IN}$ as a function of phase-shift resulting from the application of the bias voltage $V_{BIAS}$ to the legs 54 and 56 in the example of FIG. 2 via the PIN diodes 62 and 64, respectively. Therefore, reference is to be made to the example of FIG. 2 in the following description of the examples of FIGS. 3-6.

Figure 3:
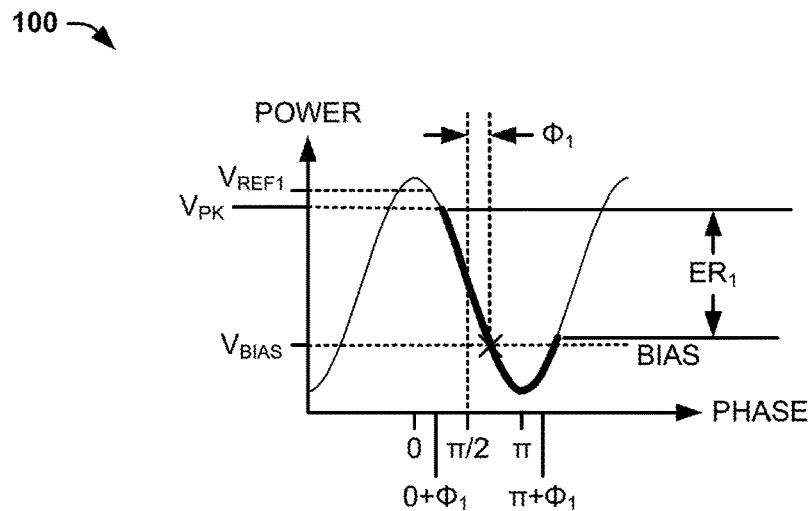
FIG. 3 illustrates an example of a graph of optical power.
Figure 4:
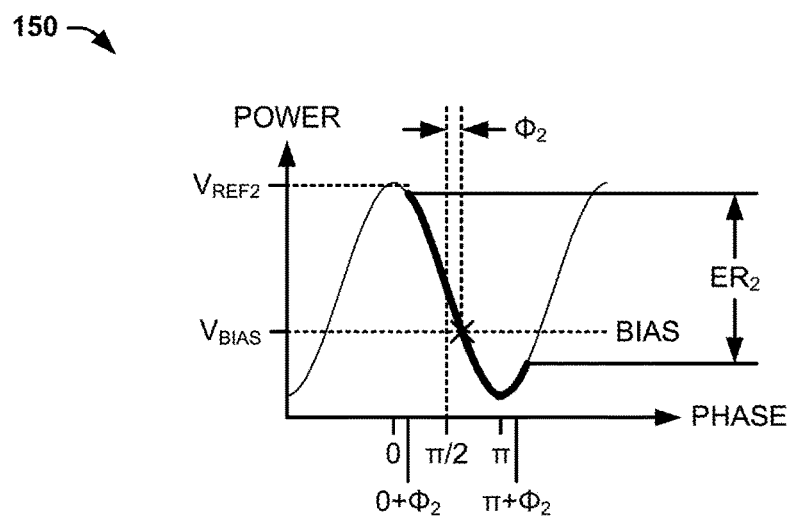
FIG. 4 illustrates another example of a graph of optical power.

The graph 100 in the example of FIG. 3 demonstrates an initial condition of the MZM system 50. Thus, the bias controller 76 can set an initial predetermined low amplitude of the bias voltage $V_{BIAS}$ via the digital signal BIAS and a corresponding predetermined initial amplitude of the reference voltage $V_{REF1}$ via the digital signal REF. Thus, the bias point of the Mach-Zehnder modulator 52 can be offset from the quadrature bias point of $\pi/2$ by an error phase $\phi_1$. Therefore, the relative phase of the component portions of the optical input signal $OPT_{IN}$ can vary between a phase of $0+\phi_1$ and $\pi+\phi_1$. Accordingly, based on the sinusoidal variation of the relative phase of the component portions of the optical input signal $OPT_{IN}$, the intensity of the optical output signal $OPT_{OUT}$ can vary between an amplitude that is less than an approximate intensity peak (full additive combination of the component portions of the optical input signal $OPT_{IN}$) and greater than an approximate intensity trough (full subtractive combination of the component portions of the optical input signal $OPT_{IN}$). The bias controller 76 can thus iteratively increase the amplitude of the bias voltage $V_{BIAS}$ via the digital signal BIAS until the corresponding peak voltage $V_{PK}$ is approximately equal to the predetermined initial reference voltage $V_{REF1}$, and thus the peak amplitude associated with the phase changes of the component portions is approximately equal to the intensity defined by the initial predetermined reference voltage $V_{REF1}$. As a result, the graph 100 demonstrates a first extinction ratio $ER_1$ that corresponds to the extinction ratio of the MZM system 50 that is defined by the predetermined initial reference voltage $V_{REF1}$.

In response to the peak voltage $V_{PK}$ being approximately equal to the predetermined initial reference voltage $V_{REF1}$, the bias controller 76 can increase the reference voltage $V_{REF}$ to a next iterative amplitude. The graph 150 in the example of FIG. 4 demonstrates an increased amplitude of the reference voltage $V_{REF}$, demonstrated as $V_{REF2}$, and an amplitude of the bias voltage $V_{BIAS}$ which can correspond to the amplitude of the bias voltage $V_{BIAS}$ at which the peak voltage $V_{PK}$ was approximately equal to the predetermined initial reference voltage $V_{REF1}$. Thus, the bias point of the Mach-Zehnder modulator 52 can be offset from the quadrature bias point of $\pi/2$ by an error phase $\phi_2$. Therefore, the relative phase of the component portions of the optical input signal $OPT_{IN}$ can vary between a phase of $0+\phi_2$ and $\pi+\phi_2$. Accordingly, based on the sinusoidal variation of the relative phase of the component portions of the optical input signal $OPT_{IN}$, the intensity of the optical output signal $OPT_{OUT}$ can still vary between an amplitude that is less than the approximate intensity peak and greater than the approximate intensity trough. The bias controller 76 can thus iteratively increase the amplitude of the bias voltage $V_{BIAS}$ via the digital signal BIAS until the corresponding peak voltage $V_{PK}$ is approximately equal to the reference voltage $V_{REF2}$, and thus the peak amplitude associated with the phase changes of the component portions is approximately equal to the intensity defined by the reference voltage $V_{REF2}$. As a result, the graph 150 demonstrates a second extinction ratio $ER_2$ that corresponds to the extinction ratio of the MZM system 50 that is defined by the reference voltage $V_{REF2}$, and is thus greater than the extinction ratio $ER_1$.

Figure 5:
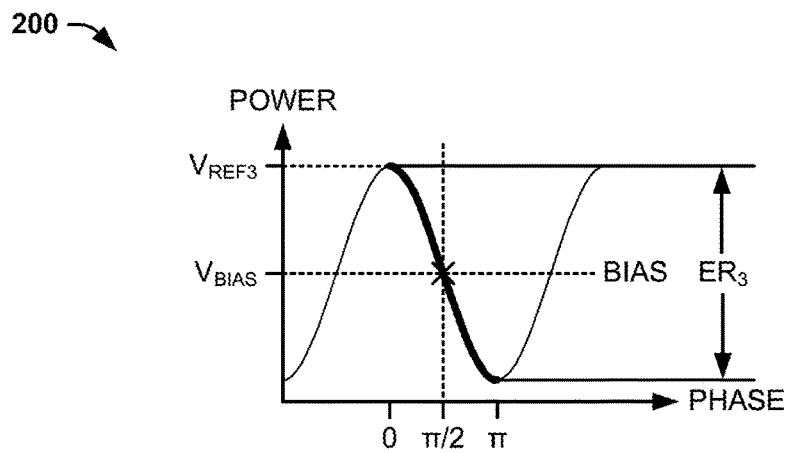
FIG. 5 illustrates yet another example of a graph of optical power.

In response to the peak voltage $V_{PK}$ being approximately equal to the reference voltage $V_{REF2}$, the bias controller 76 can increase the reference voltage $V_{REF}$ to a next iterative amplitude. The graph 200 in the example of FIG. 5 demonstrates an increased amplitude of the reference voltage $V_{REF}$, demonstrated as $V_{REF3}$, and an amplitude of the bias voltage $V_{BIAS}$. In the example of FIG. 5, the bias point of the Mach-Zehnder modulator 52 is demonstrated as approximately equal to the quadrature bias point of $\pi/2$. Therefore, the relative phase of the component portions of the optical input signal $OPT_{IN}$ can vary between a phase of 0 and T. Accordingly, based on the sinusoidal variation of the relative phase of the component portions of the optical input signal $OPT_{IN}$, the intensity of the optical output signal $OPT_{OUT}$ can vary between an amplitude that is at the approximate intensity peak and an approximate intensity trough (full subtractive combination of the component portions of the optical input signal $OPT_{IN}$). For example, the graph 200 can demonstrate an amplitude of the bias voltage $V_{BIAS}$ at which the peak voltage $V_{PK}$ is approximately equal to the reference voltage $V_{REF3}$, such as after a plurality of iterative increases of the bias voltage $V_{BIAS}$ during an iteration of the reference voltage $V_{REF}$ equal to the amplitude $V_{REF3}$. The example of FIG. 5 thus demonstrates an amplitude of the reference voltage $V_{REF}$ at which the corresponding extinction ratio $ER_3$ is substantially maximized for substantially optimal performance of the MZM system 50.

As described previously, the bias controller 76 is configured to monitor the extinction ratio of the MZM system 50 based on the signal CMP to substantially maximize the extinction ratio. While the graph 200 in the example of FIG. 5 demonstrates the substantial maximum extinction ratio $ER_3$, the bias controller 76 is able to recognize that the extinction ratio $ER_3$ is greater than the extinction ratios of previous iterations of the reference voltage $V_{REF}$ (e.g., the extinction ratio $ER_1$ associated with the reference voltage $V_{REF1}$ and the extinction ratio $ER_2$ associated with the reference voltage $V_{REF2}$). Thus, because the bias controller 76 is unable to recognize that the extinction ratio $ER_3$ is the approximate maximum extinction ratio, the bias controller 76 continues the iterative increase of the reference voltage $V_{REF}$.

Figure 6:
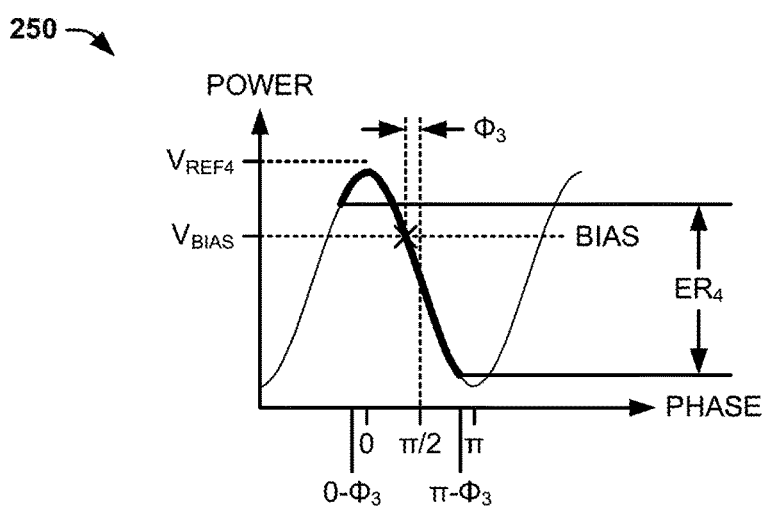
FIG. 6 illustrates yet a further example of a graph of optical power.

In response to the peak voltage $V_{PK}$ being approximately equal to the reference voltage $V_{REF3}$, the bias controller 76 can increase the reference voltage $V_{REF}$ to a next iterative amplitude. The graph 250 in the example of FIG. 6 demonstrates an increased amplitude of the reference voltage $V_{REF}$, demonstrated as $V_{REF4}$, and an amplitude of the bias voltage $V_{BIAS}$ that can correspond to a plurality of iterative increases of the bias voltage subsequent to the increase of the reference voltage $V_{REF}$ to the amplitude $V_{REF4}$. In the example of FIG. 6, the bias point of the Mach-Zehnder modulator 52 can be offset from the quadrature bias point of $\pi/2$ by an error phase $\phi_3$. Therefore, the relative phase of the component portions of the optical input signal $OPT_{IN}$ can vary between a phase of $0-\phi_3$ and $\pi-\phi_3$. However, the reference voltage $V_{REF4}$ has an amplitude that is greater than an amplitude of the approximate intensity peak. Based on the sinusoidal variation of the relative phase of the component portions of the optical input signal $OPT_{IN}$, the intensity of the optical output signal $OPT_{OUT}$ varies between an amplitude that is less than the approximate intensity peak and greater than the approximate intensity trough. As a result, the graph 250 demonstrates a fourth extinction ratio $ER_4$ that corresponds to the extinction ratio of the MZM system 50 that is defined by the reference voltage $V_{REF4}$, and is thus less than the approximate maximum extinction ratio $ER_3$.

Therefore, in the example of FIG. 6, the peak voltage $V_{PK}$ will never be equal to the reference voltage $V_{REF4}$. Thus, in response to an iterative increase of the bias voltage $V_{BIAS}$ a predetermined number of times without the peak voltage $V_{PK}$ being approximately equal to the reference voltage $V_{REF}$ (e.g., the reference voltage $V_{REF4}$), the bias controller 76 can determine that the extinction ratio has decreased relative to a previous iterative increase of the reference voltage $V_{REF}$ (e.g., the reference voltage $V_{REF3}$). In response, the bias controller 76 can decrease the amplitude of the reference voltage $V_{REF}$ to the previous iteration (e.g., the reference voltage $V_{REF3}$), and thus decrease the bias voltage $V_{BIAS}$ to the amplitude corresponding to the amplitude at which the peak voltage $V_{PK}$ was approximately equal to the previous iterative amplitude of the reference voltage $V_{REF}$. Accordingly, the bias controller 76 can monitor the extinction ratio to substantially maximize the extinction ratio to tune to the MZM system 50 to approximately optimal operation to achieve peak output power of the optical output signal $OPT_{OUT}$.

Thus, the examples of FIGS. 3-6 demonstrate a manner in which the bias controller 76 can monitor the extinction ratio to substantially maximize the extinction ratio to tune to the MZM system 50 to approximately optimal operation. The operation described herein can be implemented automatically during operation of the MZM system 50, without interrupting the high speed modulation of the MZM system 50 (e.g., via the differential modulation signals $HSM_1$ and $HSM_2$). Accordingly, the MZM system 50 can implement an efficient automatic tuning implementation that can operate during normal operation of the MZM system 50, and thus without interrupting or interfering with the data modulation of the optical input signal $OPT_{IN}$ to provide the optical output signal $OPT_{OUT}$. While the examples of FIGS. 3-6 demonstrate only four iterative changes of the amplitude of the reference voltage $V_{REF}$, it is to be understood that the bias controller 76 can implement more or less changes to the amplitude of the reference voltage $V_{REF}$, with any of a variety of iterative increases of the bias voltage $V_{BIAS}$ in each iterative amplitude of the reference voltage $V_{REF}$.

Figure 7:
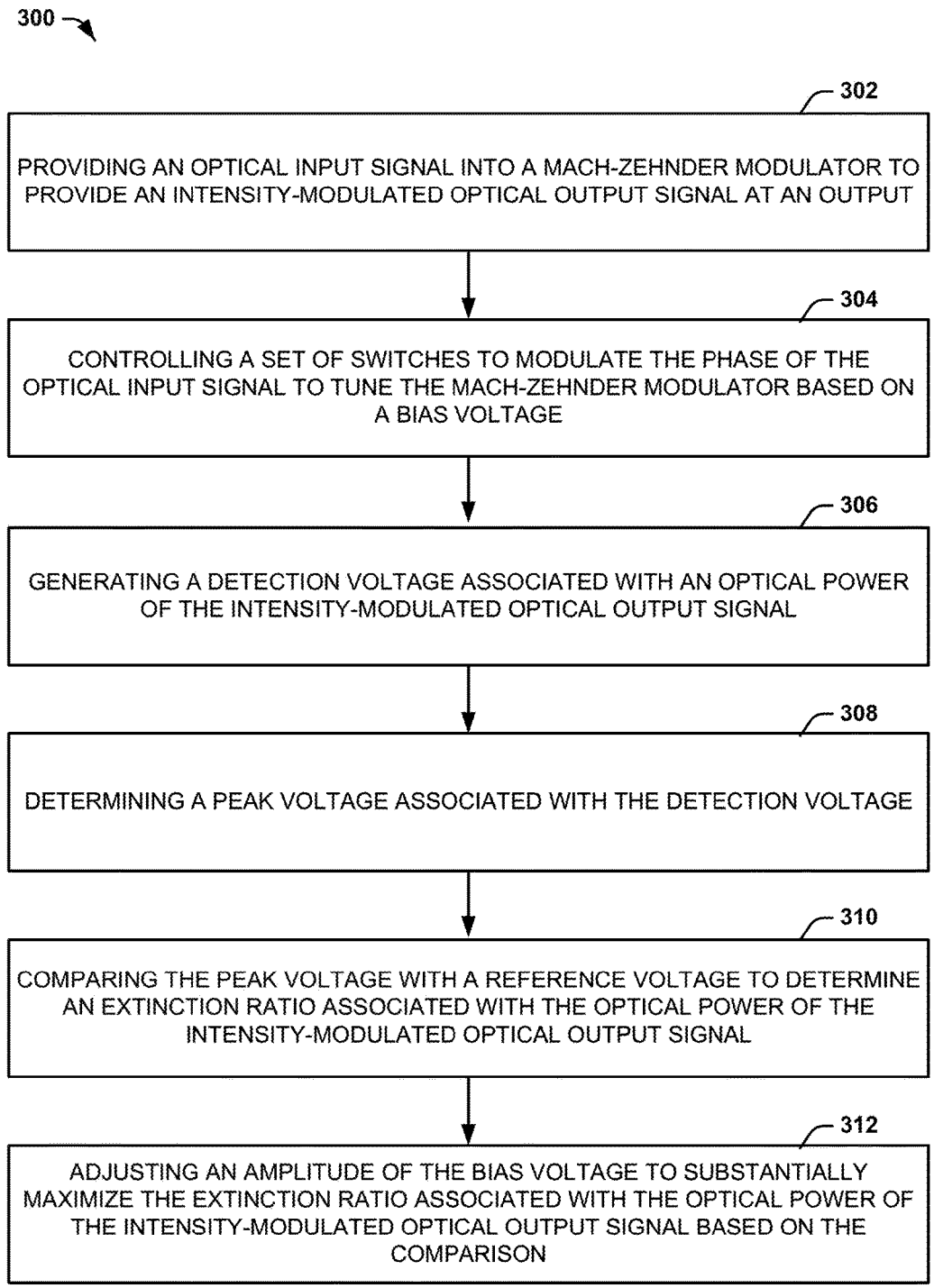
FIG. 7 illustrates an example of a method for tuning a bias-based Mach-Zehnder modulation system.

In view of the foregoing structural and functional features described above, an example methodology will be better appreciated with reference to FIG. 7. While, for purposes of simplicity of explanation, the methodology of FIG. 7 is shown and described as executing serially, it is to be understood and appreciated that the present invention is not limited by the illustrated order, as some embodiments could in other embodiments occur in different orders and/or concurrently from that shown and described herein.

FIG. 7 illustrates an example of a method 300 for tuning a bias-based Mach-Zehnder modulation system (e.g., the MZM system 10). At 302, an optical input signal (e.g., the optical input signal $OPT_{IN}$) is provided into a Mach-Zehnder modulator (e.g., the Mach-Zehnder modulator 12) to provide an intensity-modulated optical output signal (e.g., the optical output signal $OPT_{OUT}$) at an output. At 304, a set of switches (e.g., the switches $SW_1$ and $SW_2$) is controlled to modulate the phase of the optical input signal to tune the Mach-Zehnder modulator based on a bias voltage (e.g., the bias voltage $V_{BIAS}$). At 306, a detection voltage (e.g., the detection signal DET) associated with an optical power of the intensity-modulated optical output signal is generated. At 308, a peak voltage (e.g., the peak voltage $V_{PK}$) associated with the detection voltage is determined. At 310, the peak voltage is compared with a reference voltage (e.g., the reference voltage $V_{REF}$) to determine an extinction ratio associated with the optical power of the intensity-modulated optical output signal. At 312, an amplitude of the bias voltage is adjusted to substantially maximize the extinction ratio (e.g., the extinction ratio $ER_3$) associated with the optical power of the intensity-modulated optical output signal based on the comparison.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A bias-based Mach-Zehnder modulation (MZM) system comprising:
    a Mach-Zehnder modulator to receive and split an optical input signal and to provide an intensity-modulated optical output signal based on a high-frequency data signal to modulate a relative phase of the split optical input signal to transmit data and based on a bias voltage to modulate the relative phase of the split optical input signal to tune the Mach-Zehnder modulator;
    a bias feedback controller to compare a detection voltage associated with the intensity-modulated output signal with a reference voltage to measure an extinction ratio associated with an optical power of the intensity-modulated optical output signal and to adjust the bias voltage based on the comparison to substantially maximize the extinction ratio, the bias feedback controller comprising a bias controller to set an amplitude of the bias voltage in response to the comparison of the peak voltage with the reference voltage;
    a peak voltage detector to detect a peak voltage associated with a peak amplitude of the detection voltage,
    wherein the bias controller is further to iteratively increase the reference voltage in response to detecting that the peak voltage is equal to the reference voltage and to iteratively increase the bias voltage based on the comparison until the bias controller detects that the peak voltage is equal to the reference voltage during each iterative increase of the reference voltage up to a point when the bias controller detects that the substantially maximum extinction ratio is achieved.

2. The system of claim 1, wherein the bias feedback controller comprises:
    a voltage comparator to compare the peak voltage with the reference voltage; and.

3. The system of claim 2, wherein the bias controller is further to alternately control a set of switches to modulate the phase of the optical input signal to tune the Mach-Zehnder modulator based on the bias voltage via a respective set of PIN diodes associated with the Mach-Zehnder modulator.

4. The system of claim 2, wherein the bias controller is further to set an initial predetermined amplitude of the bias voltage that is less than an operational amplitude of the bias voltage and to iteratively increase the bias voltage based on the comparison until the bias controller detects that the peak voltage is equal to the reference voltage.

5. The system of claim 2, wherein the iterative increase of the reference voltage by the bias controller in response to the detection that the peak voltage is equal to the reference voltage and that the extinction ratio increased continues until the bias controller detects a decrease in the extinction ratio, then to decrease the reference voltage by a single iteration to substantially maximize the extinction ratio.

6. The system of claim 2, wherein the Mach-Zehnder modulator comprises an optical power tap to provide a portion of the intensity-modulated optical output signal to a photodetector that is to generate the detection voltage based on an intensity of the portion of the intensity-modulated optical output signal.

7. The system of claim 2, wherein the peak voltage detector comprises a gain-adjustable transimpedance amplifier and a peak detection amplifier to detect the peak voltage.

8. A method for tuning a Mach-Zehnder modulation (MZM) system, the method comprising:
    providing an optical input signal into a Mach-Zehnder modulator to provide an intensity-modulated optical output signal at an output;
    controlling a set of switches to modulate the phase of the optical input signal to tune the Mach-Zehnder modulator based on a bias voltage;
    generating a detection voltage associated with an optical power of the intensity-modulated optical output signal;
    determining a peak voltage associated with the detection voltage;
    comparing the peak voltage with a reference voltage to determine an extinction ratio associated with the optical power of the intensity-modulated optical output signal; and
    adjusting an amplitude of the bias voltage to substantially maximize the extinction ratio associated with the optical power of the intensity-modulated optical output signal based on the comparison, wherein
    adjusting the amplitude of the bias voltage comprises iteratively increasing the bias voltage based on the comparison;
    iteratively increasing the bias voltage until the peak voltage is equal to the reference voltage at each iterative increase of the reference voltage; and
    iteratively increasing the reference voltage until an approximate maximum magnitude of the extinction ratio is achieved.

9. The method of claim 8, further comprising setting an initial predetermined amplitude of the bias voltage that is less than an operational amplitude of the bias voltage.

10. The method of claim 8, wherein iteratively increasing the reference voltage comprises:
    iteratively increasing the reference voltage until a predetermined number of iterations of increase of the bias voltage have expired without the peak voltage being equal to the reference voltage; and
    decreasing the reference voltage by a single iteration in response to the expiration of the predetermined number of iterations of the bias voltage.

11. A bias-based Mach-Zehnder modulation (MZM) system comprising:
    a Mach-Zehnder modulator to receive and split an optical input signal and to provide an intensity-modulated optical output signal based on a high-frequency data signal to modulate a relative phase of the split optical input signal to transmit data and based on a bias voltage provided via a set of switches to modulate the relative phase of the split optical input signal to tune the Mach-Zehnder modulator; and a bias feedback controller comprising:
- a peak voltage detector to detect a peak voltage associated with a peak amplitude of a detection voltage associated with an amplitude of the intensity-modulated output signal;
- a voltage comparator to compare the peak voltage with a reference voltage to measure an extinction ratio associated with an optical power of the intensity-modulated optical output signal; and
- a bias controller to independently set an amplitude of the bias voltage and the reference voltage in response to the comparison of the peak voltage with the reference voltage to substantially maximize the extinction ratio,
- the bias controller further to iteratively increase the reference voltage in response to detecting that the peak voltage is equal to the reference voltage and to iteratively increase the bias voltage based on the comparison until the bias controller detects that the peak voltage is equal to the reference voltage during each iterative increase of the reference voltage to a point when the bias controller detects that the substantially maximum extinction ratio is achieved.

12. The system of claim 11, wherein the bias controller is further to set an initial predetermined amplitude of the bias voltage that is less than an operational amplitude of the bias voltage and to iteratively increase the bias voltage based on the comparison until the bias controller detects that the peak voltage is equal to the reference voltage.

13. The system of claim 11, wherein the bias controller is further to iteratively increase the reference voltage in response to detecting that the peak voltage is equal to the reference voltage and to iteratively increase the bias voltage based on the comparison until the bias controller detects that the peak voltage is equal to the reference voltage during each iterative increase of the reference voltage until the bias controller detects that the substantially maximum extinction ratio is achieved.

14. The system of claim 1, wherein the bias feedback controller includes a photodiode that is configured to convert a portion of the intensity-modulated output signal to an electrical signal.

15. The system of claim 1, wherein the peak voltage detector is configured as a filter to generate the peak voltage.

16. The system of claim 1 further comprising at least one amplifier that transmits the intensity-modulated optical output signal based on the high-frequency data signal to modulate the relative phase of the split optical input signal.

17. The system of claim 1 further comprising at least PIN diode to provide the bias voltage to modulate the relative phase of the split optical input signal.

18. The system of claim 1 further comprising a pair of optical switches, each of the switches is associated with a dedicated optical path for each of the split optical input signals, and when activated, the bias voltage is applied to the dedicated optical path.

* * * * *